(12) United States Patent
Chou (10) Patent No.: US 10,938,229 B2
(45) Date of Patent: *Mar. 2, 2021

(54) WIRELESS POWER-SUPPLYING MOUSE PAD WITH APPARATUS-IDENTIFYING FUNCTION

(71) Applicant: Hades-Gaming Corporation, New Taipei (TW)

(72) Inventor: Hung-Jen Chou, New Taipei (TW)

(73) Assignee: Hades-Gaming Corporation, New Taipei (TW)

( * ) Notice: Subject to any disclaimer, the term of this patent is extended or adjusted under 35 U.S.C. 154(b) by 141 days.

This patent is subject to a terminal disclaimer.

(21) Appl. No.: 16/111,964

(22) Filed: Aug. 24, 2018

(65) Prior Publication Data
US 2019/0305576 A1 Oct. 3, 2019

(30) Foreign Application Priority Data
Mar. 27, 2018 (TW) .............................. 107203947 U (51) Int. Cl.
*H02J 7/02* (2016.01)
*H02J 7/04* (2006.01)
*G06F 3/039* (2013.01)
*H02J 7/00* (2006.01)

(52) U.S. Cl.
CPC ............ *H02J 7/025* (2013.01); *G06F 3/0395* (2013.01); *H02J 7/027* (2013.01); *H02J 7/045* (2013.01); *H02J 7/00045* (2020.01)

(58) Field of Classification Search
CPC .. H02J 7/025; H02J 7/045; H02J 7/027; H02J 2007/0001; H02J 50/80; H02J 50/90; H02J 50/10; H02J 50/00; H02J 50/001; H02J 50/005; H02J 50/05; H02J 50/15; H02J 7/00714; H02J 7/00718; H02J 7/007184; H02J 7/007186; H02J 7/00302; H02J 7/00304; H02J 7/00306; H02J 7/00308; H02J 7/00309; H02J 7/0047;
(Continued)

(56) References Cited

U.S. PATENT DOCUMENTS

| 10,622,828 B2 * | 4/2020 | Chou .................... H01F 38/14 |
| 2007/0139000 A1 * | 6/2007 | Kozuma ................. H02J 50/80 320/108 |
| 2017/0158079 A1 * | 6/2017 | Lim ........................ H02J 7/04 |

(Continued)

*Primary Examiner* — Drew A Dunn
*Assistant Examiner* — Sailesh Thapa
(74) *Attorney, Agent, or Firm* — Muncy, Geissler, Olds & Lowe, P.C.

(57) ABSTRACT

A wireless power-supplying mouse pad with an apparatus-identifying function is applied to a wirelessly-charged apparatus. The wirelessly-charged apparatus includes an inductive identification tag. The wireless power-supplying mouse pad includes a mouse pad body, an inductive charging unit and a control unit. The inductive charging unit includes a tag identifier. The tag identifier identifies the inductive identification tag of the wirelessly-charged apparatus to obtain an identification signal. After the tag identifier obtains the identification signal, the tag identifier sends the identification signal to the control unit. After the control unit receives the identification signal, the control unit controls an emitting power of the inductive charging unit based on the identification signal.

6 Claims, 5 Drawing Sheets

(58) Field of Classification Search
CPC . H02J 7/00045; H02J 7/00034; G06F 3/0395;
G06F 1/266; H04B 5/0037
See application file for complete search history.

(56) References Cited

U.S. PATENT DOCUMENTS

| | | | |
|---|---|---|---|
| 2019/0165595 A1* | 5/2019 | Mortun | H02J 7/025 |
| 2019/0235041 A1* | 8/2019 | Lee | G01S 1/68 |
| 2019/0393735 A1* | 12/2019 | Lee | H02J 7/027 |

* cited by examiner

WIRELESS POWER-SUPPLYING MOUSE PAD WITH APPARATUS-IDENTIFYING FUNCTION

BACKGROUND OF THE INVENTION

Field of the Invention

The present invention relates to a wireless power-supplying mouse pad, and especially relates to a wireless power-supplying mouse pad with an apparatus-identifying function.

Description of the Related Art

A mouse is a common electronic apparatus which is usually connected to a computer or a notebook computer to control a cursor displayed on a monitor. Therefore, the mouse is a very convenient and important electronic apparatus. In order to use the mouse more smoothly, the mouse is usually used on a mouse pad, so that the mouse pad is almost necessary for the mouse. The mouse needs power to work. Afterwards, a related art wireless power-supplying mouse pad is provided to wirelessly supply power to a wirelessly-charged mouse. The related art wireless power-supplying mouse pad is very convenient for a user. The user does not need to worry about an electric power source for the wirelessly-charged mouse.

Besides charging the wirelessly-charged mouse, the related art wireless power-supplying mouse pad can also charge other wirelessly-charged apparatuses, such as a wirelessly-charged keyboard, a wirelessly-charged headset or a wirelessly-charged cellphone. However, the disadvantage of the related art wireless power-supplying mouse pad is that the related art wireless power-supplying mouse pad does not provide different wirelessly-charged apparatuses with different emitting powers. Namely, the related art wireless power-supplying mouse pad provides the wirelessly-charged mouse, the wirelessly-charged keyboard, the wirelessly-charged headset or the wirelessly-charged cellphone with the same emitting power. This causes that the wirelessly-charged apparatuses are broken easily and the energy is wasted.

SUMMARY OF THE INVENTION

In order to solve the above-mentioned problems, an object of the present invention is to provide a wireless power-supplying mouse pad with an apparatus-identifying function.

In order to achieve the object of the present invention mentioned above, the wireless power-supplying mouse pad of the present invention is applied to a wirelessly-charged apparatus. The wirelessly-charged apparatus comprises an inductive identification tag. The wireless power-supplying mouse pad comprises a mouse pad body, an inductive charging unit and a control unit. The inductive charging unit is arranged in the mouse pad body. The control unit is electrically connected to the inductive charging unit. The control unit is arranged in the mouse pad body. Moreover, the inductive charging unit comprises a tag identifier. The tag identifier is electrically connected to the control unit. Moreover, the tag identifier is configured to identify the inductive identification tag of the wirelessly-charged apparatus to obtain an identification signal. After the tag identifier obtains the identification signal, the tag identifier is configured to send the identification signal to the control unit. After the control unit receives the identification signal, the control unit is configured to control an emitting power of the inductive charging unit based on the identification signal.

Moreover, in an embodiment of the present invention, for the wireless power-supplying mouse pad mentioned above, the inductive charging unit further comprises an inductive charging loop electrically connected to the control unit and the tag identifier.

Moreover, in an embodiment of the present invention, for the wireless power-supplying mouse pad mentioned above, the inductive charging unit further comprises an inductive charging coil electrically connected to the inductive charging loop. Moreover, the control unit is configured to control a magnitude of an output energy outputted from the inductive charging loop to the inductive charging coil to control the emitting power of the inductive charging unit based on the identification signal, so that the inductive charging coil and the wirelessly-charged apparatus are configured to form an inductive coupling to perform a wireless charging to the wirelessly-charged apparatus.

Moreover, in an embodiment of the present invention, for the wireless power-supplying mouse pad mentioned above, the inductive charging loop comprises a current-detecting unit electrically connected to the inductive charging coil and the control unit. Moreover, when the inductive charging coil and the wirelessly-charged apparatus are configured to form the inductive coupling to perform the wireless charging to the wirelessly-charged apparatus, the current-detecting unit is configured to detect a charging current of the inductive charging coil to obtain a charging status signal. After the current-detecting unit obtains the charging status signal, the current-detecting unit is configured to send the charging status signal to the control unit. After the control unit receives the identification signal and the charging status signal, the control unit is configured to control the magnitude of the output energy outputted from the inductive charging loop to the inductive charging coil to control the emitting power of the inductive charging unit based on the identification signal and the charging status signal.

Moreover, in an embodiment of the present invention, the wireless power-supplying mouse pad mentioned above further comprises a charged battery electrically connected to the control unit and the inductive charging unit. Moreover, the charged battery is configured to supply power to the control unit and the inductive charging unit.

Moreover, in an embodiment of the present invention, the wireless power-supplying mouse pad mentioned above further comprises a power-converting unit electrically connected to the control unit and the inductive charging unit. Moreover, the power-converting unit is configured to supply power to the control unit and the inductive charging unit.

Moreover, in an embodiment of the present invention, the wireless power-supplying mouse pad mentioned above further comprises a power connection port electrically connected to the power-converting unit.

Moreover, in an embodiment of the present invention, the wireless power-supplying mouse pad mentioned above further comprises a charge-indicating light-emitting diode electrically connected to the control unit. Moreover, when the inductive charging coil and the wirelessly-charged apparatus are configured to form the inductive coupling to perform the wireless charging to the wirelessly-charged apparatus, the control unit is configured to drive the charge-indicating light-emitting diode to light based on the charging status signal.

The advantage of the present invention is to identify the wirelessly-charged apparatus and provide a proper emitting power to perform the wireless charging to the wirelessly-charged apparatus to protect the wirelessly-charged apparatus and to save energy.

Please refer to the detailed descriptions and figures of the present invention mentioned below for further understanding the technology, method and effect of the present invention. The figures are only for references and descriptions, and the present invention is not limited by the figures.

DETAILED DESCRIPTION OF THE INVENTION

Figure 1:
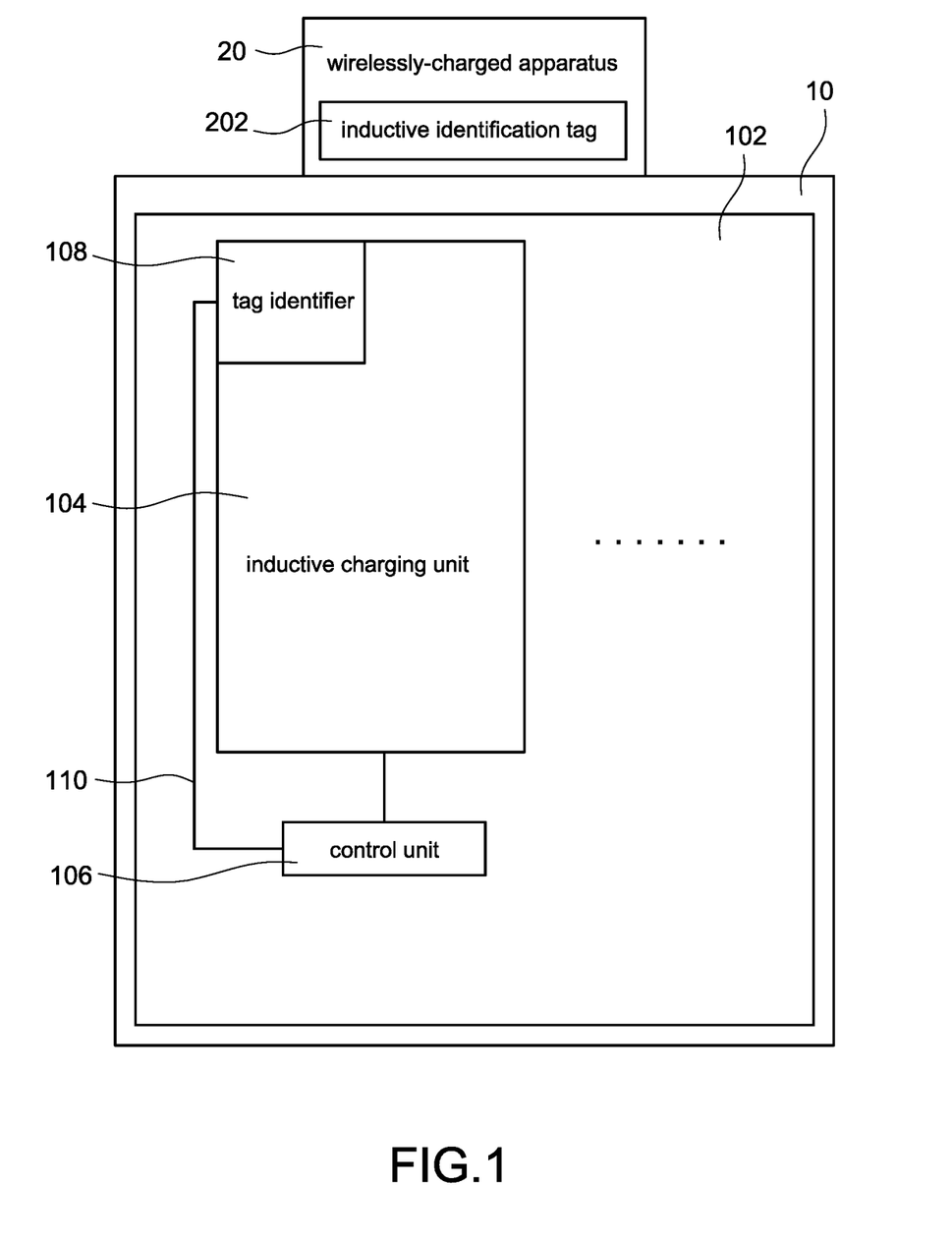
FIG. 1 shows a block diagram of the first embodiment of the wireless power-supplying mouse pad of the present invention.
Figure 2:
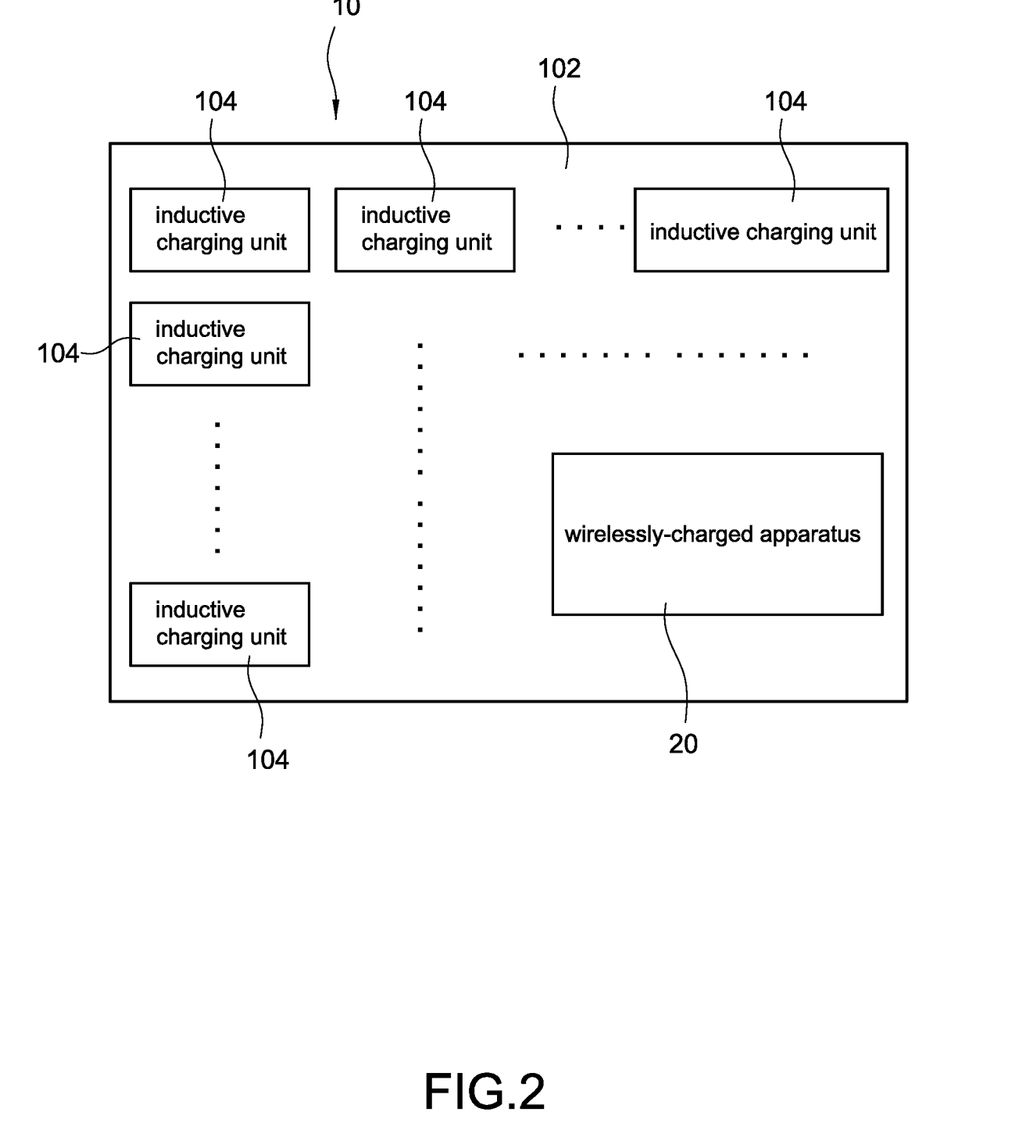
FIG. 2 shows a top view of the wireless power-supplying mouse pad of the present invention.

In the present disclosure, numerous specific details are provided, to provide a thorough understanding of embodiments of the invention. Persons of ordinary skill in the art will recognize, however, that the present invention can be practiced without one or more of the specific details. In other instances, well-known details are not shown or described to avoid obscuring aspects of the present invention. Please refer to following detailed description and figures for the technical content of the present invention:

FIG. 1 shows a block diagram of the first embodiment of the wireless power-supplying mouse pad of the present invention. FIG. 2 shows a top view of the wireless power-supplying mouse pad of the present invention. A wireless power-supplying mouse pad 10 with an apparatus-identifying function of the present invention is applied to a wirelessly-charged apparatus 20. The wirelessly-charged apparatus 20 comprises an inductive identification tag 202. The wireless power-supplying mouse pad 10 comprises a mouse pad body 102, a plurality of inductive charging units 104 and a control unit 106. Each of the inductive charging units 104 comprises a tag identifier 108. The inductive charging units 104 are arranged in the mouse pad body 102. The control unit 106 is electrically connected to the inductive charging units 104. The control unit 106 is arranged in the mouse pad body 102. The tag identifier 108 is electrically connected to the control unit 106. The wirelessly-charged apparatus 20 comprises an induction coil (not shown in FIG. 1), an alternating-current-to-direct-current conversion circuit (not shown in FIG. 1), an electricity storage unit (not shown in FIG. 1), and so on, to achieve wirelessly receiving energy, converting energy and storing energy.

In FIG. 1, the tag identifier 108 identifies the inductive identification tag 202 of the wirelessly-charged apparatus 20 to obtain an identification signal 110. After the tag identifier 108 obtains the identification signal 110, the tag identifier 108 sends the identification signal 110 to the control unit 106. After the control unit 106 receives the identification signal 110, the control unit 106 controls an emitting power of the inductive charging unit 104 based on the identification signal 110. For example, if the control unit 106 determines that the identification signal 110 refers to a wirelessly-charged mouse, the control unit 106 controls the emitting power emitted from the inductive charging unit 104 to the wirelessly-charged apparatus 20 as a charging power suitable for the wirelessly-charged mouse. If the control unit 106 determines that the identification signal 110 refers to a wirelessly-charged keyboard, the control unit 106 controls the emitting power emitted from the inductive charging unit 104 to the wirelessly-charged apparatus 20 as a charging power suitable for the wirelessly-charged keyboard. If the control unit 106 determines that the identification signal 110 refers to a wirelessly-charged headset, the control unit 106 controls the emitting power emitted from the inductive charging unit 104 to the wirelessly-charged apparatus 20 as a charging power suitable for the wirelessly-charged headset. If the control unit 106 determines that the identification signal 110 refers to a wirelessly-charged cellphone, the control unit 106 controls the emitting power emitted from the inductive charging unit 104 to the wirelessly-charged apparatus 20 as a charging power suitable for the wirelessly-charged cellphone. The emitting powers mentioned above are different. The charging powers mentioned above are different.

Figure 3:
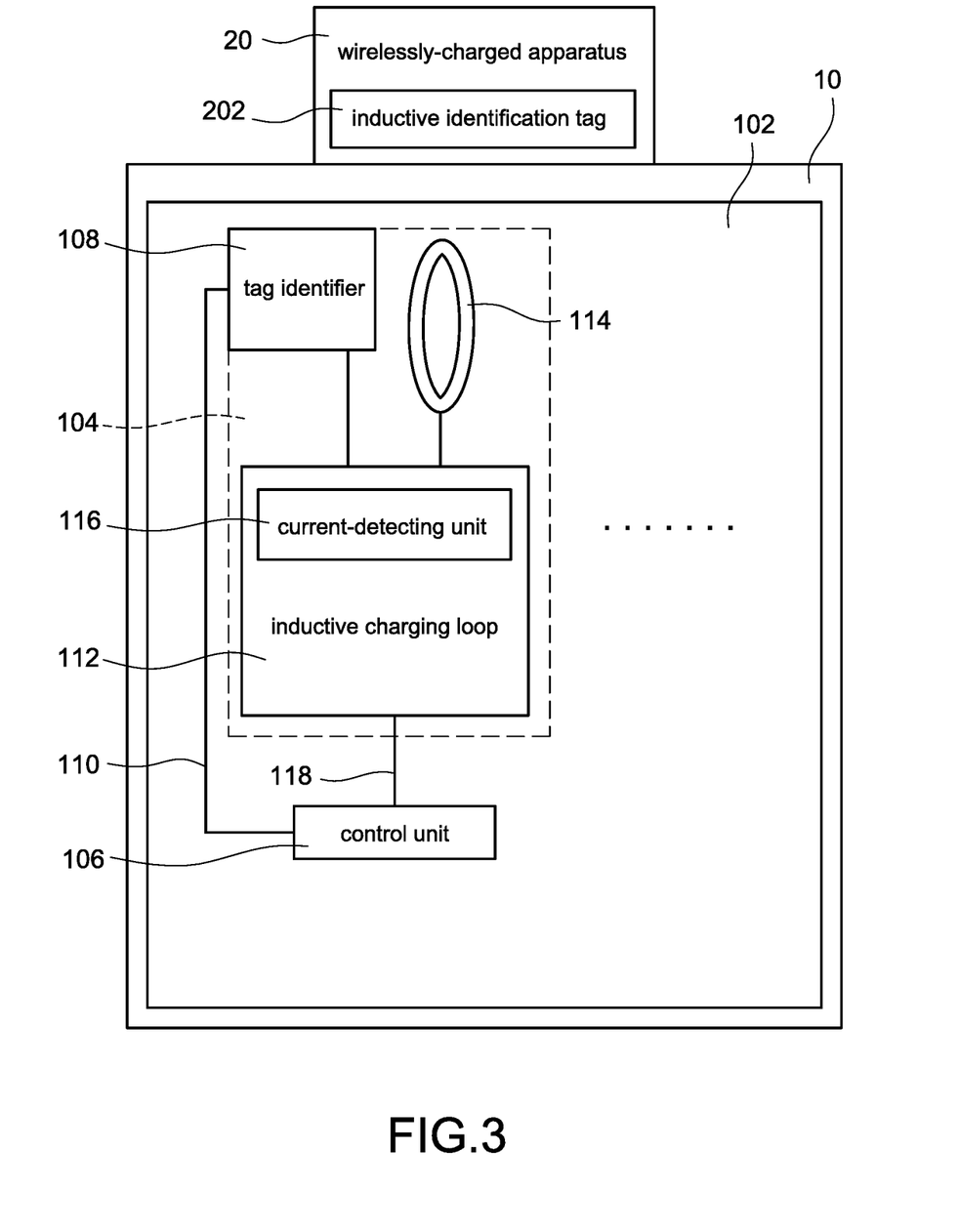
FIG. 3 shows a block diagram of the second embodiment of the wireless power-supplying mouse pad of the present invention.

FIG. 3 shows a block diagram of the second embodiment of the wireless power-supplying mouse pad of the present invention. A wireless power-supplying mouse pad 10 with an apparatus-identifying function of the present invention is applied to a wirelessly-charged apparatus 20. The wirelessly-charged apparatus 20 comprises an inductive identification tag 202. The wireless power-supplying mouse pad 10 comprises a mouse pad body 102, a plurality of inductive charging units 104 and a control unit 106. Each of the inductive charging units 104 comprises a tag identifier 108, an inductive charging loop 112 and an inductive charging coil 114. The inductive charging loop 112 comprises a current-detecting unit 116. The inductive charging units 104 are arranged in the mouse pad body 102. The control unit 106 is electrically connected to the inductive charging units 104. The control unit 106 is arranged in the mouse pad body 102. The tag identifier 108 is electrically connected to the control unit 106. The inductive charging loop 112 is electrically connected to the control unit 106 and the tag identifier 108. The inductive charging coil 114 is electrically connected to the inductive charging loop 112. The current-detecting unit 116 is electrically connected to the inductive charging coil 114 and the control unit 106. The wirelessly-charged apparatus 20 comprises an induction coil (not shown in FIG. 3), an alternating-current-to-direct-current conversion circuit (not shown in FIG. 3), an electricity storage unit (not shown in FIG. 3), and so on, to achieve wirelessly receiving energy, converting energy and storing energy.

In FIG. 3, the tag identifier 108 identifies the inductive identification tag 202 of the wirelessly-charged apparatus 20 to obtain an identification signal 110. After the tag identifier 108 obtains the identification signal 110, the tag identifier 108 sends the identification signal 110 to the control unit 106. After the control unit 106 receives the identification signal 110, the control unit 106 controls an emitting power of the inductive charging unit 104 based on the identification signal 110. The control unit 106 controls a magnitude of an output energy outputted from the inductive charging loop 112 to the inductive charging coil 114 to control the emitting power of the inductive charging unit 104 based on the identification signal 110, so that the inductive charging coil 114 and the wirelessly-charged apparatus 20 form an inductive coupling to perform a wireless charging to the wirelessly-charged apparatus 20. When the inductive charging coil 114 and the wirelessly-charged apparatus 20 form the inductive coupling to perform the wireless charging to the wirelessly-charged apparatus 20, the current-detecting unit 116 detects a charging current of the inductive charging coil 114 to obtain a charging status signal 118. After the current-detecting unit 116 obtains the charging status signal 118, the current-detecting unit 116 sends the charging status signal 118 to the control unit 106. After the control unit 106 receives the identification signal 110 and the charging status signal 118, the control unit 106 controls the magnitude of the output energy outputted from the inductive charging loop 112 to the inductive charging coil 114 to control the emitting power of the inductive charging unit 104 based on the identification signal 110 and the charging status signal 118. The other contents of FIG. 3 are similar with the contents of the figures mentioned above so they are not repeated here.

Moreover, when the control unit 106 determines that the charging status signals 118 obtained by detecting the charging currents of a first quantity of the inductive charging coils 114 of the inductive charging units 104 are less than a charging predetermined value respectively (which means the wireless charging is not performed completely), the control unit 106 correspondingly controls the magnitudes of the output energies outputted from the inductive charging loops 112 to the first quantity of the inductive charging coils 114 of the inductive charging units 104 as a first energy value respectively. When the control unit 106 determines that the charging status signals 118 obtained by detecting the charging currents of a second quantity of the inductive charging coils 114 of the inductive charging units 104 are greater than or equal to the charging predetermined value respectively, the control unit 106 correspondingly controls the magnitudes of the output energies outputted from the inductive charging loops 112 to the second quantity of the inductive charging coils 114 of the inductive charging units 104 as a second energy value respectively. The first quantity is greater than zero. The second quantity is greater than zero. The first quantity and the second quantity are a total quantity of the inductive charging units 104. The second energy value is greater than the first energy value. The first energy value is greater than or equal to zero.

For example, the total quantity of the inductive charging units 104 is 100. There are 84 of the inductive charging units 104 not near the wirelessly-charged apparatus 20, so that 84 of the charging status signals 118 obtained by detecting 84 of the charging currents of 84 of the inductive charging coils 114 of 84 of the inductive charging units 104 are less than the charging predetermined value respectively, and the control unit 106 correspondingly controls the magnitudes of 84 of the output energies outputted from 84 of the inductive charging loops 112 to 84 of the inductive charging coils 114 of 84 of the inductive charging units 104 as the first energy value respectively. There are 16 of the inductive charging units 104 near the wirelessly-charged apparatus 20, so that 16 of the charging status signals 118 obtained by detecting 16 of the charging currents of 16 of the inductive charging coils 114 of 16 of the inductive charging units 104 are greater than or equal to the charging predetermined value respectively, and the control unit 106 correspondingly controls the magnitudes of 16 of the output energies outputted from 16 of the inductive charging loops 112 to 16 of the inductive charging coils 114 of 16 of the inductive charging units 104 as the second energy value respectively. The first quantity is 84. The second quantity is 16.

The charging status signals 118 obtained by detecting the charging currents of the inductive charging coils 114 of the inductive charging units 104 not near the wirelessly-charged apparatus 20 are weaker (namely, less than the charging predetermined value), so that the control unit 106 controls the magnitudes of the output energies outputted from the inductive charging loops 112 to the inductive charging coils 114 of the inductive charging units 104 not near the wirelessly-charged apparatus 20 as the first energy value respectively to save more energy.

The charging status signals 118 obtained by detecting the charging currents of the inductive charging coils 114 of the inductive charging units 104 near the wirelessly-charged apparatus 20 are stronger (namely, greater than or equal to the charging predetermined value), so that the control unit 106 controls the magnitudes of the output energies outputted from the inductive charging loops 112 to the inductive charging coils 114 of the inductive charging units 104 near the wirelessly-charged apparatus 20 as the second energy value respectively.

As the wirelessly-charged apparatus 20 (for example, the wirelessly-charged mouse) moves on the mouse pad body 102, locations of the inductive charging units 104 near the wirelessly-charged apparatus 20 will be changed accordingly. The present invention can detect movements of the wirelessly-charged apparatus 20, so that the magnitudes of the output energies outputted from the inductive charging loops 112 to the inductive charging coils 114 of the inductive charging units 104 near the wirelessly-charged apparatus 20 are stronger. The magnitudes of the output energies outputted from the inductive charging loops 112 to the inductive charging coils 114 of the inductive charging units 104 not near the wirelessly-charged apparatus 20 are weaker to save more energy.

Moreover, in order to avoid the charging status signal 118 continually through the charging predetermined value, the present invention has similar hysteresis effect for the charging status signal 118, which is described below:

When the control unit 106 determines that the charging status signals 118 obtained by detecting the charging currents of a first quantity of the inductive charging coils 114 of the inductive charging units 104 are less than a first hysteresis value respectively (which means the wireless charging is not performed completely), the control unit 106 correspondingly controls the magnitudes of the output energies outputted from the inductive charging loops 112 to the first quantity of the inductive charging coils 114 of the inductive charging units 104 as a first energy value respectively.

When the control unit 106 determines that the charging status signals 118 obtained by detecting the charging currents of a second quantity of the inductive charging coils 114 of the inductive charging units 104 are greater than a second hysteresis value respectively, the control unit 106 correspondingly controls the magnitudes of the output energies outputted from the inductive charging loops 112 to the second quantity of the inductive charging coils 114 of the inductive charging units 104 as a second energy value respectively.

When the control unit 106 determines that the charging status signals 118 obtained by detecting the charging currents of a third quantity of the inductive charging coils 114 of the inductive charging units 104 are between the first hysteresis value and the second hysteresis value respectively and the charging status signals 118 are less than the first hysteresis value before being between the first hysteresis value and the second hysteresis value, the control unit 106 correspondingly controls the magnitudes of the output energies outputted from the inductive charging loops 112 to the third quantity of the inductive charging coils 114 of the inductive charging units 104 as the first energy value respectively.

When the control unit 106 determines that the charging status signals 118 obtained by detecting the charging currents of a fourth quantity of the inductive charging coils 114 of the inductive charging units 104 are between the first hysteresis value and the second hysteresis value respectively and the charging status signals 118 are greater than the second hysteresis value before being between the first hysteresis value and the second hysteresis value, the control unit 106 correspondingly controls the magnitudes of the output energies outputted from the inductive charging loops 112 to the fourth quantity of the inductive charging coils 114 of the inductive charging units 104 as the second energy value respectively.

The first quantity is greater than zero. The second quantity is greater than zero. The third quantity is greater than zero. The fourth quantity is greater than zero. The first quantity, the second quantity, the third quantity and the fourth quantity are a total quantity of the inductive charging units 104. The second hysteresis value is greater than the first hysteresis value. The first hysteresis value is greater than zero. The second energy value is greater than the first energy value. The first energy value is greater than or equal to zero.

For example, when the control unit 106 determines that 64 of the charging status signals 118 obtained by detecting 64 of the charging currents of 64 of the inductive charging coils 114 of 64 of the inductive charging units 104 are less than the first hysteresis respectively, the control unit 106 correspondingly controls the magnitudes of 64 of the output energies outputted from 64 of the inductive charging loops 112 to 64 of the inductive charging coils 114 of 64 of the inductive charging units 104 as the first energy value respectively.

When the control unit 106 determines that 16 of the charging status signals 118 obtained by detecting 16 of the charging currents of 16 of the inductive charging coils 114 of 16 of the inductive charging units 104 are greater than the second hysteresis respectively, the control unit 106 correspondingly controls the magnitudes of 16 of the output energies outputted from 16 of the inductive charging loops 112 to 16 of the inductive charging coils 114 of 16 of the inductive charging units 104 as the second energy value respectively.

When the control unit 106 determines that 11 of the charging status signals 118 obtained by detecting 11 of the charging currents of 11 of the inductive charging coils 114 of 11 of the inductive charging units 104 are between the first hysteresis value and the second hysteresis value respectively and 11 of the charging status signals 118 are less than the first hysteresis value before being between the first hysteresis value and the second hysteresis value, the control unit 106 correspondingly controls the magnitudes of 11 of the output energies outputted from 11 of the inductive charging loops 112 to 11 of the inductive charging coils 114 of 11 of the inductive charging units 104 as the first energy value respectively.

When the control unit 106 determines that 9 of the charging status signals 118 obtained by detecting 9 of the charging currents of 9 of the inductive charging coils 114 of 9 of the inductive charging units 104 are between the first hysteresis value and the second hysteresis value respectively and 9 of the charging status signals 118 are greater than the second hysteresis value before being between the first hysteresis value and the second hysteresis value, the control unit 106 correspondingly controls the magnitudes of 9 of the output energies outputted from 9 of the inductive charging loops 112 to 9 of the inductive charging coils 114 of 9 of the inductive charging units 104 as the second energy value respectively.

In the embodiment mentioned above, the first quantity is 64, the second quantity is 16, the third quantity is 11, the fourth quantity is 9, and the total quantity of the inductive charging units 104 is 100.

Figure 4:
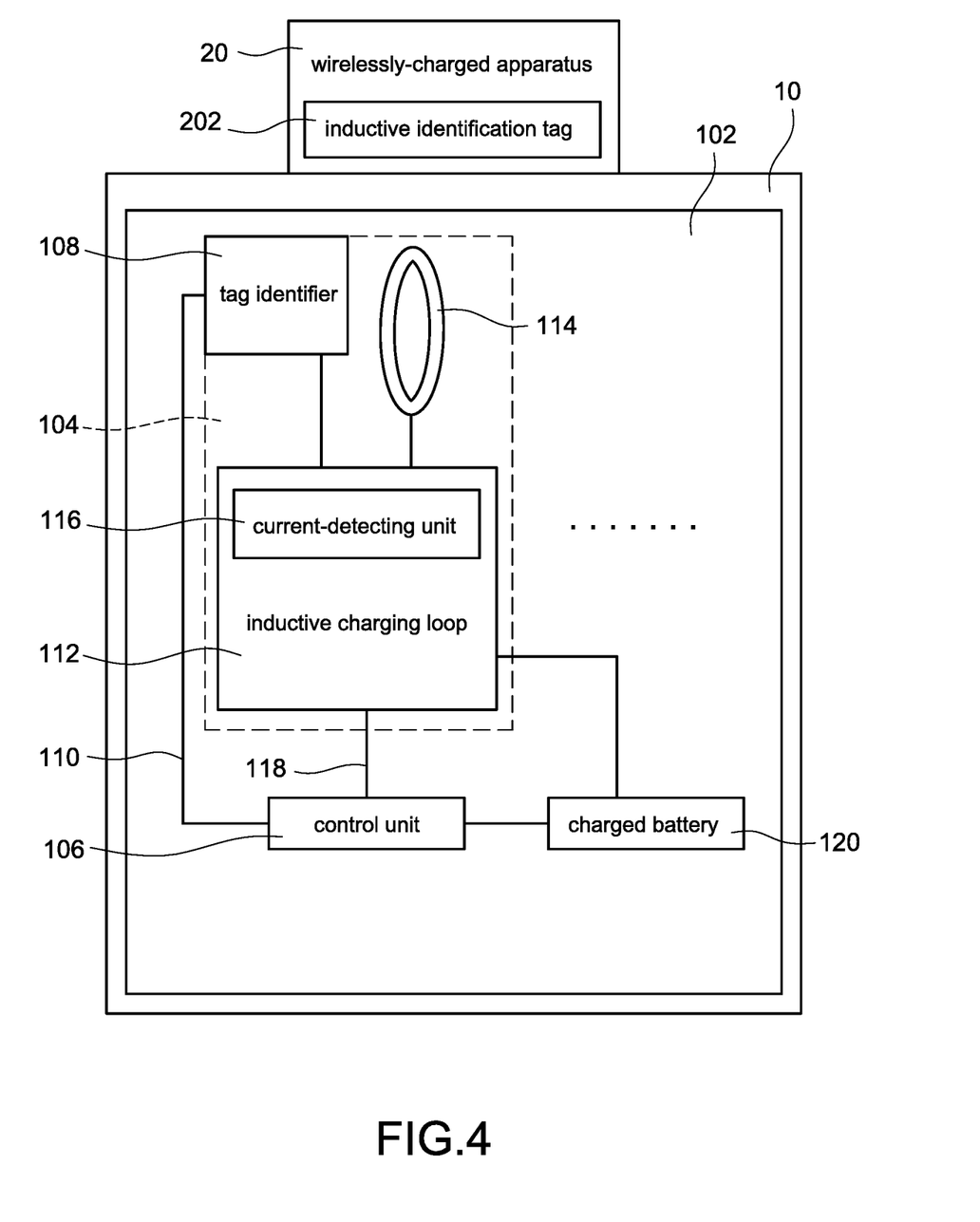
FIG. 4 shows a block diagram of the third embodiment of the wireless power-supplying mouse pad of the present invention.

FIG. 4 shows a block diagram of the third embodiment of the wireless power-supplying mouse pad of the present invention. A wireless power-supplying mouse pad 10 with an apparatus-identifying function of the present invention is applied to a wirelessly-charged apparatus 20. The wirelessly-charged apparatus 20 comprises an inductive identification tag 202. The wireless power-supplying mouse pad 10 comprises a mouse pad body 102, a plurality of inductive charging units 104, a control unit 106 and a charged battery 120. Each of the inductive charging units 104 comprises a tag identifier 108, an inductive charging loop 112 and an inductive charging coil 114. The inductive charging loop 112 comprises a current-detecting unit 116. The inductive charging units 104 are arranged in the mouse pad body 102. The control unit 106 is electrically connected to the inductive charging units 104. The control unit 106 is arranged in the mouse pad body 102. The tag identifier 108 is electrically connected to the control unit 106. The inductive charging loop 112 is electrically connected to the control unit 106 and the tag identifier 108. The inductive charging coil 114 is electrically connected to the inductive charging loop 112. The current-detecting unit 116 is electrically connected to the inductive charging coil 114 and the control unit 106. The charged battery 120 is electrically connected to the control unit 106 and the inductive charging units 104. The wirelessly-charged apparatus 20 comprises an induction coil (not shown in FIG. 4), an alternating-current-to-direct-current conversion circuit (not shown in FIG. 4), an electricity storage unit (not shown in FIG. 4), and so on, to achieve wirelessly receiving energy, converting energy and storing energy.

In FIG. 4, the tag identifier 108 identifies the inductive identification tag 202 of the wirelessly-charged apparatus 20 to obtain an identification signal 110. After the tag identifier 108 obtains the identification signal 110, the tag identifier 108 sends the identification signal 110 to the control unit 106. After the control unit 106 receives the identification signal 110, the control unit 106 controls an emitting power of the inductive charging unit 104 based on the identification signal 110. The control unit 106 controls a magnitude of an output energy outputted from the inductive charging loop 112 to the inductive charging coil 114 to control the emitting power of the inductive charging unit 104 based on the identification signal 110, so that the inductive charging coil 114 and the wirelessly-charged apparatus 20 form an inductive coupling to perform a wireless charging to the wirelessly-charged apparatus 20. When the inductive charging coil 114 and the wirelessly-charged apparatus 20 form the inductive coupling to perform the wireless charging to the wirelessly-charged apparatus 20, the current-detecting unit 116 detects a charging current of the inductive charging coil 114 to obtain a charging status signal 118. After the current-detecting unit 116 obtains the charging status signal 118, the current-detecting unit 116 sends the charging status signal 118 to the control unit 106. After the control unit 106 receives the identification signal 110 and the charging status signal 118, the control unit 106 controls the magnitude of the output energy outputted from the inductive charging loop 112 to the inductive charging coil 114 to control the emitting power of the inductive charging unit 104 based on the identification signal 110 and the charging status signal 118. The charged battery 120 supplies power to the control unit 106 and the inductive charging units 104. The other contents of FIG. 4 are similar with the contents of the figures mentioned above so they are not repeated here.

Figure 5:
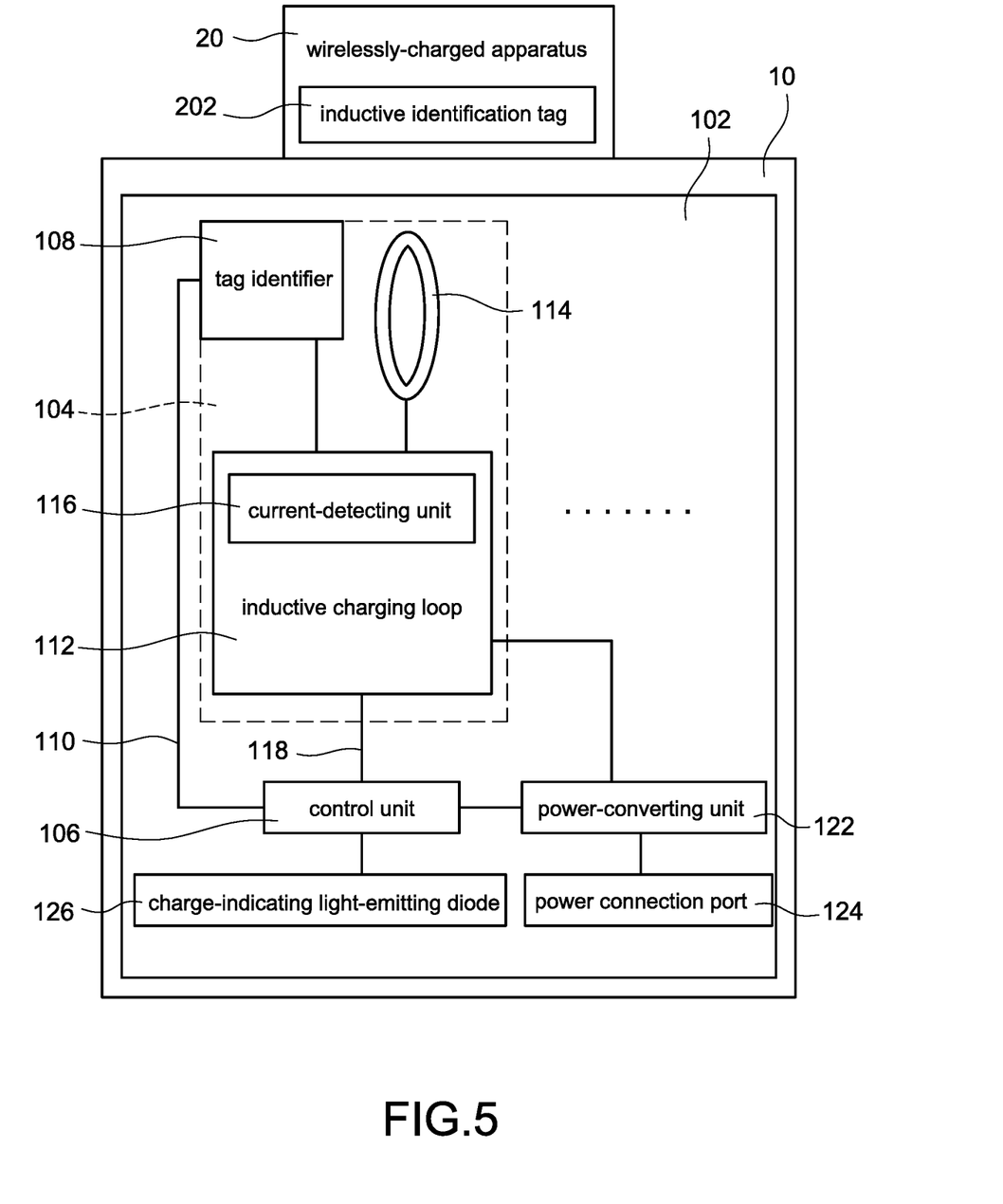
FIG. 5 shows a block diagram of the fourth embodiment of the wireless power-supplying mouse pad of the present invention.

FIG. 5 shows a block diagram of the fourth embodiment of the wireless power-supplying mouse pad of the present invention. A wireless power-supplying mouse pad 10 with an apparatus-identifying function of the present invention is applied to a wirelessly-charged apparatus 20. The wirelessly-charged apparatus 20 comprises an inductive identification tag 202. The wireless power-supplying mouse pad 10 comprises a mouse pad body 102, a plurality of inductive charging units 104, a control unit 106, a power-converting unit 122, a power connection port 124 and a charge-indicating light-emitting diode 126. Each of the inductive charging units 104 comprises a tag identifier 108, an inductive charging loop 112 and an inductive charging coil 114. The inductive charging loop 112 comprises a current-detecting unit 116. The inductive charging units 104 are arranged in the mouse pad body 102. The control unit 106 is electrically connected to the inductive charging units 104. The control unit 106 is arranged in the mouse pad body 102. The tag identifier 108 is electrically connected to the control unit 106. The inductive charging loop 112 is electrically connected to the control unit 106 and the tag identifier 108. The inductive charging coil 114 is electrically connected to the inductive charging loop 112. The current-detecting unit 116 is electrically connected to the inductive charging coil 114 and the control unit 106. The power-converting unit 122 is electrically connected to the control unit 106 and the inductive charging unit 104. The power connection port 124 is electrically connected to the power-converting unit 122. The charge-indicating light-emitting diode 126 is electrically connected to the control unit 106. The wirelessly-charged apparatus 20 comprises an induction coil (not shown in FIG. 5), an alternating-current-to-direct-current conversion circuit (not shown in FIG. 5), an electricity storage unit (not shown in FIG. 5), and so on, to achieve wirelessly receiving energy, converting energy and storing energy.

In FIG. 5, the tag identifier 108 identifies the inductive identification tag 202 of the wirelessly-charged apparatus 20 to obtain an identification signal 110. After the tag identifier 108 obtains the identification signal 110, the tag identifier 108 sends the identification signal 110 to the control unit 106. After the control unit 106 receives the identification signal 110, the control unit 106 controls an emitting power of the inductive charging unit 104 based on the identification signal 110. The control unit 106 controls a magnitude of an output energy outputted from the inductive charging loop 112 to the inductive charging coil 114 to control the emitting power of the inductive charging unit 104 based on the identification signal 110, so that the inductive charging coil 114 and the wirelessly-charged apparatus 20 form an inductive coupling to perform a wireless charging to the wirelessly-charged apparatus 20. When the inductive charging coil 114 and the wirelessly-charged apparatus 20 form the inductive coupling to perform the wireless charging to the wirelessly-charged apparatus 20, the current-detecting unit 116 detects a charging current of the inductive charging coil 114 to obtain a charging status signal 118. After the current-detecting unit 116 obtains the charging status signal 118, the current-detecting unit 116 sends the charging status signal 118 to the control unit 106. After the control unit 106 receives the identification signal 110 and the charging status signal 118, the control unit 106 controls the magnitude of the output energy outputted from the inductive charging loop 112 to the inductive charging coil 114 to control the emitting power of the inductive charging unit 104 based on the identification signal 110 and the charging status signal 118. The power-converting unit 122 supplies power to the control unit 106 and the inductive charging units 104. When the inductive charging coil 114 and the wirelessly-charged apparatus 20 form the inductive coupling to perform the wireless charging to the wirelessly-charged apparatus 20, the control unit 106 drives the charge-indicating light-emitting diode 126 to light based on the charging status signal 118. The other contents of FIG. 5 are similar with the contents of the figures mentioned above so they are not repeated here.

The tag identifier 108 identifying the inductive identification tag 202 of the wirelessly-charged apparatus 20 to obtain the identification signal 110 mentioned above can be achieved by many methods. For example, the tag identifier 108 and the inductive identification tag 202 of the wirelessly-charged apparatus 20 form an electromagnetic coupling to determine the inductive identification tag 202 of the wirelessly-charged apparatus 20 (for example, to determine an inductance of the inductive identification tag 202 of the wirelessly-charged apparatus 20) to identify the inductive identification tag 202 of the wirelessly-charged apparatus 20 to obtain the identification signal 110. Or, the tag identifier 108 and the inductive identification tag 202 of the wirelessly-charged apparatus 20 utilize any related art wireless identification technology (for example, RFID technology) to identify the inductive identification tag 202 of the wirelessly-charged apparatus 20 to obtain the identification signal 110.

Moreover, the mouse pad body 102 mentioned above comprises two embodiments:

1. The mouse pad body 102 is a one-piece mouse pad (for example, with a thickness 0.3 cm), so that the electronic components which are mentioned above and are arranged in the mouse pad body 102 are small enough to be arranged in the mouse pad body 102.

2. The mouse pad body 102 comprises the one-piece mouse pad mentioned above and a lower housing. The one-piece mouse pad is arranged on the lower housing, so that the electronic components which are mentioned above and are arranged in the mouse pad body 102 are arranged in the lower housing.

The advantage of the present invention is to identify the wirelessly-charged apparatus 20 and provide a proper emitting power to perform the wireless charging to the wirelessly-charged apparatus 20 to protect the wirelessly-charged apparatus 20 and to save energy.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A wireless power-supplying mouse pad with an apparatus-identifying function applied to a wirelessly-charged apparatus, the wirelessly-charged apparatus comprising an inductive identification tag, the wireless power-supplying mouse pad comprising:
   a mouse pad body;

a plurality of inductive charging units arranged in the mouse pad body; and a control unit electrically connected to the inductive charging units and arranged in the mouse pad body, wherein each of the inductive charging units comprises:

a tag identifier electrically connected to the control unit;

an inductive charging loop electrically connected to the control unit and the tag identifier; and an inductive charging coil electrically connected to the inductive charging loop, wherein the tag identifier is configured to identify the inductive identification tag of the wirelessly-charged apparatus to obtain an identification signal; after the tag identifier obtains the identification signal, the tag identifier is configured to send the identification signal to the control unit; after the control unit receives the identification signal, the control unit is configured to control an emitting power of each of the inductive charging units based on the identification signal;

wherein when the control unit is configured to determine that a plurality of charging status signals obtained by detecting a plurality of charging currents of a first quantity of the inductive charging coils are less than a charging predetermined value respectively, the control unit is configured to correspondingly control a plurality of magnitudes of a plurality of output energies outputted from the inductive charging loops to the first quantity of the inductive charging coils as a first energy value respectively;

wherein when the control unit is configured to determine that the charging status signals obtained by detecting the charging currents of a second quantity of the inductive charging coils are greater than or equal to the charging predetermined value respectively, the control unit is configured to correspondingly control the magnitudes of the output energies outputted from the inductive charging loops to the second quantity of the inductive charging coils as a second energy value respectively;

wherein the first quantity is greater than zero; the second quantity is greater than zero; the first quantity and the second quantity are a total quantity of the inductive charging units; the second energy value is greater than the first energy value; the first energy value is greater than or equal to zero.

2. The wireless power-supplying mouse pad in claim 1, wherein the inductive charging loop comprises:

a current-detecting unit electrically connected to the inductive charging coil and the control unit, wherein when the inductive charging coil and the wirelessly-charged apparatus are configured to form an inductive coupling to perform a wireless charging to the wirelessly-charged apparatus, the current-detecting unit is configured to detect the charging current of the inductive charging coil to obtain the charging status signal; after the current-detecting unit obtains the charging status signal, the current-detecting unit is configured to send the charging status signal to the control unit; after the control unit receives the identification signal and the charging status signal, the control unit is configured to control the magnitude of the output energy outputted from the inductive charging loop to the inductive charging coil to control the emitting power of the inductive charging unit based on the identification signal and the charging status signal.

3. The wireless power-supplying mouse pad in claim 2, further comprising:

a charged battery electrically connected to the control unit and the inductive charging units, wherein the charged battery is configured to supply power to the control unit and the inductive charging units.

4. The wireless power-supplying mouse pad in claim 2, further comprising:

a power-converting unit electrically connected to the control unit and the inductive charging units, wherein the power-converting unit is configured to supply power to the control unit and the inductive charging units.

5. The wireless power-supplying mouse pad in claim 4, further comprising:

a power connection port electrically connected to the power-converting unit.

6. The wireless power-supplying mouse pad in claim 5, further comprising:

a charge-indicating light-emitting diode electrically connected to the control unit, wherein when the inductive charging coil and the wirelessly-charged apparatus are configured to form the inductive coupling to perform the wireless charging to the wirelessly-charged apparatus, the control unit is configured to drive the charge-indicating light-emitting diode to light based on the charging status signal.

* * * * *